Oct. 22, 1968 A. A. SPANJERSBERG 3,407,386

CHARACTER READING SYSTEM

Filed Dec. 24, 1964

4 Sheets-Sheet 1

INVENTOR.
A. A. SPANJERSBERG

BY Hugh A Kirk

ATTORNEY

Oct. 22, 1968 A. A. SPANJERSBERG 3,407,386

CHARACTER READING SYSTEM

Filed Dec. 24, 1964 4 Sheets-Sheet 2

INVENTOR.
A. A. SPANJERSBERG

BY Hugh A. Kirk

ATTORNEY

INVENTOR.
A. A. SPANJERSBERG
BY Hugh A. Kirk
ATTORNEY

INVENTOR.
A. A. SPANJERSBERG
BY Hugh A. Kirk
ATTORNEY

United States Patent Office 3,407,386

Patented Oct. 22, 1968

3,407,386

CHARACTER READING SYSTEM

Arie Adriaan Spanjersberg, Leiderdorp, Netherlands, assignor to De Staat der Nederlanden, ten Deze Vertegenwoordigd Door de Directeur-Generaal der Posterijen, Telegrafie en Telefonie, The Hague, Netherlands Filed Dec. 24, 1964, Ser. No. 421,040
Claims priority, application Netherlands, Jan. 2, 1964, 6400004
12 Claims. (Cl. 340—146.3)

ABSTRACT OF THE DISCLOSURE

This invention comprises means for reading irregularly written characters or digits by projecting them on a photo-cathode screen. Then the image of each character on this screen is divided into halves and/or quadrants to determine the relative height and number of intersections or spots detected along each parallel scanning line relative to the intersections or spots along the center scanning line as the scanning lines scan from the center of each image out to its edges in each direction, and to determine where two lines of the image being so scanned merge, if at all.

This is accomplished by first scanning the image or character on the photo-cathode screen to determine its leading and trailing edges, and from this, determining the center line of each image. With this information the height from the top of the first intersection or spot and the number of the intersections or spots along the center line is determined, and the height of the first and second intersection along this center line is recorded. Then the image of that character is scanned parallel to and away from the center line toward its trailing edge, and then away from the center line toward its leading edge, and the location or height of the intersections or spots on each of these parallel scan lines is then compared with the height or heights of the spots or intersections recorded along the center line of that image. Also, if any scan line of an image has two or three intersections or spots, these spots are compared in successive parallel scan lines to determine if the spots merge, i.e., if two lines of the image intersect or form an outwardly closed loop, and in which half or quadrant of the image this merger occurs.

*Related application*

Priority Netherlands patent application Ser. No. 6400004, filed January 2, 1964.

*Background of invention*

Mechanical digit reading is known, for instance, from the article "An Optical Character Recognition System Using a Vidicon Scanner," by Eugene Griffin in the work "Optical Character Recognition," published by Spartan Books, 1962, page 73. The scanned digit is recorded in a matrix-memory in order to compare it with standard digit-shapes. This method and other known methods can only determine digits corresponding to given standard shapes and with a fixed disposition. Also the scanning of an image of a digit on a photo-cathode by means of an electronic means in general is known from this article.

Furthermore, the storing and reproducing of direct current voltages, from a scanning beam or other source, by means of capacitors is known from the article "Schieberegister fur Gleichspannung," by G. Heller in "Regelungstechnik," 11 (1963), No. 8, page 348.

Thus, the identifying of a character, digit, or numeral on the basis of all the bits obtained in an analysis according to a regular matrix pattern would require an information processing machine of high bit capacity for the memory and for the recognition logic, and this would have to function according to programs for the memory and for the logic. Such an operation would be slow as all the program steps would have to be performed for each vertical row of bits scanned.

*Summary of invention*

The character or digit reading system of this invention is characterized by vertically scanning along predetermined parallel lines a photo-cathode on which a charged image of the character, numeral, or digit is formed as soon as the leading edge of this character has advanced to a certain position in front of the photo-cathode screen. After the determination by the scanning means of the rear or trailing edge of this charged image, this image is scanned along vertical image lines by an electron means, such as an electron beam, running in sequence along the center line and along lines parallel to this center line on each side thereof from top to bottom. The scanning results thus obtained are recorded in triggers and in a counter for the first recognition factor (I) according to the reader of this invention, which first factor is an indication of the number of intersections or spots detected in each vertical scan line. A voltage comparator is used on the voltages of capacitors constantly charged from the beginning of an image scan line up to the moment of an intersection of this scan line by a spot, in order to ascertain the second recognition factor (II) which is an indication of the height of the first intersection on each vertical scan line relative to the first intersection on the central vertical scan line. The third recognition factor (III), or that of two merging or intersecting lines of the character image on either or both sides of the center scan line or in one or more quadrants of the image, is evaluated by means of delay circuits with a delay value equal to the duration of one vertical scanning image line and comparing the results on a number of AND-gates. The fourth recognition factor (IV) is finally evaluated by way of an AND-gate to determine the first continuously scanned spots in a part of an image which extend below the second spot on the center scan line of that image.

*Objects and advantages*

Accordingly this invention has for its purpose a method for reading characters enabling the reading of the commonest shapes even if they are slanted up to a certain angle.

Furthermore, an object of this invention is to provide a character reader having an electronic camera by which characters may pass at a constant velocity, and to recognize these characters without a complicated bit memory device in its recognition circuit, since the photo-cathode screen of the camera vidicon retains the image of the character long enough for the recognition factors to be scanned and determined.

Another object of this invention is attained by basing the recognition of characters or digits upon the determination of the following factors:

(I) The maximum number of intersections with a vertical scan line of the character, (II) The height of the beginning of the first intersection on a central vertical scan line as compared to those on other vertical scan lines of the character, (III) The occurrence of a character loop on one or both sides of the center scan line, or a criterion based on the meeting of intersecting character lines on one or both sides of the center scan line, and (IV) The height of the end of a character line or trace of the first intersection in the other vertical scan lines with respect to the beginning of the trace after the second intersection with the central vertical scan line, if such exists.

*Brief description of the views*

The above mentioned and other features, objects, and advantages and a manner of attaining them are described more specifically below by reference to an embodiment of this invention shown in the accompanying drawings, wherein.

*Detailed description*

Figure 1:
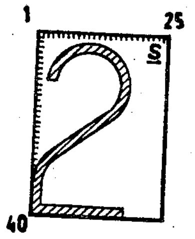
FIG. 1 is a diagram of the character numeral "2" in an area or matrix which is scanned by the device of this invention.

(A) *Method of scanning*.—The method of reading will first be illustrated for the case in which the optical information of an image is recorded in the matrix of an electronic information processing machine generally in the manner of the first article referred to above. FIG. 1 shows the numeral "2" in a matrix of 40 x 25 elements in horizontal rows 1 to 40 and vertical columns 1 to 25. It will be assumed that in column 1 the leading edge or outermost left hand black image elements, intersections, or spots of a numeral "2" occur, in other words that a numeral has been advanced as far as possible to the left. The method of the invention does not presuppose a fixed vertical position of the character numeral or digit.

After the leading edge of each digit is determined, each digit is recognized on the basis of the following program:

(1) The presence of black image elements intersections, or spots in column 25 is examined, only groups of two or more elements or spots being significant.

(2) If no black elements are found in column 25 they are sought for in column 24 and so on in each column toward the left;

(3) As soon as a positive result is obtained, the order or number of that column is divided by two, which determines the image center in the horizontal direction. For an odd order or number of columns, one is first added before the number is so divided.

(4) In the center column so determined, the number of intersections or elements is determined from top to bottom of the columns which number may be one, two or three.

(5) This determination of intersections is repeated for the next adjoining columns to the right of the center line in succession until the outermost right hand column 1 or leading edge is reached;

(6) Then this determination of intersection is repeated for the next adjoining columns to the left of the center line in succession until the outermost left hand column or trailing edge is reached. The first recognition factor I, viz., the maximum number of intersections with verticals, is now known.

Figure 2:
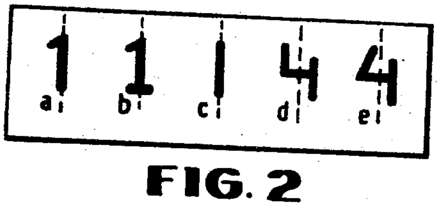
FIGS. 2 through 4 show different shapes of Arabic numerals or digits having respectively one, two, and three intersections with their central vertical scan lines, which lines are shown dotted across each digit.

(7) The shapes of all the digits in FIG. 2 have a single intersection in the central line, and those in FIGS. 2*a*, 2*c*, and 2*d* have a single intersection in each column on both sides of the dotted vertical center lines shown.

(8) In scanning the center column from top to bottom, the height of the beginning of the intersection is recorded and subsequently compared to the height of the beginning of intersections in all the remaining columns on both sides of the center line, which establishes the second recognition factor II of the height and relative location of the highest intersection.

(9) The digit of FIG. 2*d* has on both sides of the center a higher beginning of the intersections for a number of image elements (e.g., 10 or more) than the central intersection. In the digits of FIGS. 2*a* and 2*c* and usually 2*b*, the beginning of the central intersection always occurs at a same height.

(10) If in two or more succeeding columns, two intersections are found, as in the digits of FIGS. 2*b* and 2*e*, the program to be followed will be that for two intersections described in the next paragraph.

(11) For two intersections in other than the central column, the end of the first intersection is determined, scanning from top to bottom. The beginning of the second intersection is compared for each column with regard to its level or spacing from the end of the first intersection in the next column scanned. Then as soon as the end of the first intersection in a given column is on a level with the start of the second intersection in the preceding column, or if it is lower, a meeting of the two intersections has occurred and an outwardly closed loop in the image of the character or digit is determined on that side of the center column now being scanned. The reason for this complicated comparison criterion is that two intersections sometimes merge suddenly into a single intersection. The third recognition factor III is now determined and enables the discrimination between the digits shown in FIG. 2*b* and FIG. 2*e*, since in FIG. 2*b* the two intersected lines do not meet on the left, whereas they do in FIG. 2*e*. To the right both these digit shapes always have a single intersection.

Figure 3:
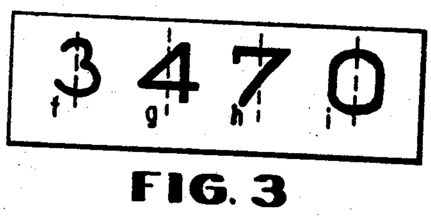

(12) If the central column for any digit has two intersections, the shape is for one of those digits shown in FIG. 3. For the digit shown in FIG. 3*f*, the greatest number of intersections with any column is three, and for this shape the program for three intersections described below in paragraph No. 13 should therefore be followed. The distinction between the shapes of the digits shown in FIGS. 3*g*, 3*h*, and 3*i* may be made on the basis of the following items:

In the digit of FIG. 3*g*, the lines intersected by the central column meet to the left and to the right. Moreover, the first intersection terminates to the right at a point lower by at least ten elements than the beginning of the second intersection on the central column;

In the digit of FIG. 3*h*, the lines or elements of this digit which are intersected by the central column only meet to the right;

In the digit of FIG. 3*i*, the lines intersected by the central column meet both to the right and to the left. However, as distinct from the digit of FIG. 3*g*, no markings occur below the beginning of the second intersection on the central line. Here the fourth recognition factor IV is utilized.

Figure 4:
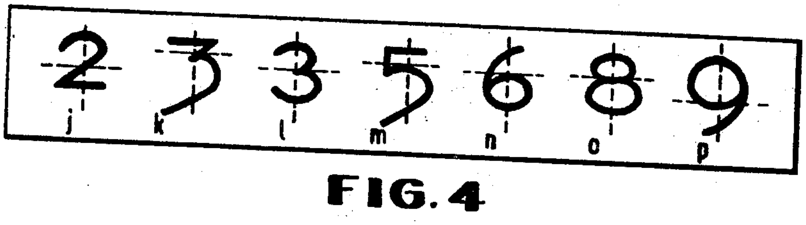
Figure 5:
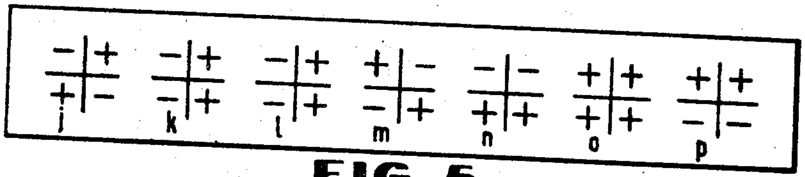
FIG. 5 is a diagram of the leading criterions or closed loops which occur in each quadrant for the character shapes shown in FIG. 4.

(13) Shapes of digits having three intersections at least along their center or any other lines are shown in FIG. 4. The locations of meeting points or outwardly closed loops of image lines will now have to be determined more exactly, to which end the height of the beginning of the second intersection in the central line is again recorded. The row at this level and the central line divide the image into quadrants which may contain meeting points of line sections, whereby the shapes of digits shown in FIG. 4 may be distinguished, as indicated in FIG. 5 by + or − in the quadrants corresponding to each digit in FIG. 4.

B. *Apparatus*—(1) *Scanning*.—According to this invention, the characters or digits shown in upright position in FIGS. 1 through 4 have recognition criteria applied to them in the following manner so that a complicated bit memory in the recognition circuit is not necessary.

Figures 6, 7:
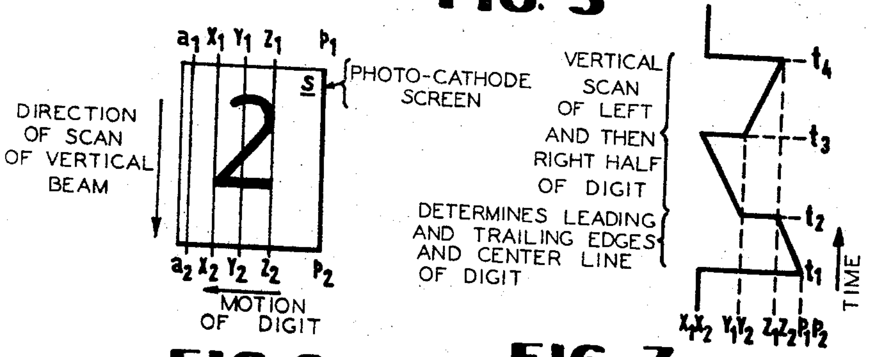
FIG. 6 is a diagram of the numeral "2" on a photocathode screen, with vertical lines across it indicating the paths of the principal scanning beams according to the system of this invention.
FIG. 7 is a wave diagram of the horizontal deflection of a scanning beam as a function of time and the principal vertical scanning lines indicated in FIG. 6.

The information bearer having the characters or digits marked thereon is moved from right to left at a constant velocity past the photo-cathode of vidicon camera upon which photo-cathode images of these characters are produced. As shown in FIG. 6, the photo-cathode screen S of the vidicon is first only illuminated along the narrow slit or column $a_1a_2$ at the left of this screen S, which column $a_1a_2$ is only scanned vertically by the electron beam of the vidicon camera, and not yet scanned horizontally. However, as soon as this vertical scanning beam discovers in this illuminated column $a_1a_2$ a black element or the leading edge of a moving character or digit, a ten micro-second flash of light illuminates the entire character which then produces a charged image of the entire character on the vidicon screen S. Now the horizontal scanning voltage for the beam is applied, so that the latent vidicon image now on the screen is scanned along vertical image lines in sequential horizontal jumps and/or increments or steps as controlled by a circuit of this invention. During this scanning of the whole image on the screen S, the vidicon camera output provides a binary video-signal conforming to the information on the information bearer. Thus a memory in the recognition circuit is not necessary since the photo-cathode retains the image for the duration of the scanning. The magnification for projecting the characters on the screen S is so adjusted that the height of the normal typewritten numeral or character will be equal to about half the height of the photo-cathode screen, thus the marked character height on the information bearer is arbitrary to a certain extent.

With the entire charge-image now appearing on the photo-cathode screen S, according to one embodiment of this invention, the scanning beam will at this moment $t_1$ jump from the vertical position $x_1x_2$ to $p_1p_2$, as shown in FIGS. 6 and 7. If the beam only encounters white elements on the vertical scan line $p_1p_2$ at the trailing or far edge of the screen S, it will be deflected linearly in horizontal increments to the left till at the instant $t_2$ a vertical scan line shows black or an intersection. This vertical scan line $z_1z_2$ is the right-hand limit or trailing edge of the digits image. The deflection current in the horizontal deflection coil is now halved and the scanning beam jumps to the central vertical scan line $y_1y_2$. The linear vertical scan beam now horizontally deflects in increments until at the instant $t_3$ the limit or leading edge vertical scan line $x_1x_2$ is reached. At this time the beam recedes again the central scan line $y_1y_2$ and commences its vertical scanning which is horizontally deflected in increments to the right up to the instant $t_4$, at which the right-hand limit or trailing edge vertical scan line $z_1z_2$ is reached. Thereupon the beam jumps back again to the vertical scan line of the leading edge $x_1x_2$, which terminates the scanning operation and leaves the beam ready for scanning the next image.

Figure 8:
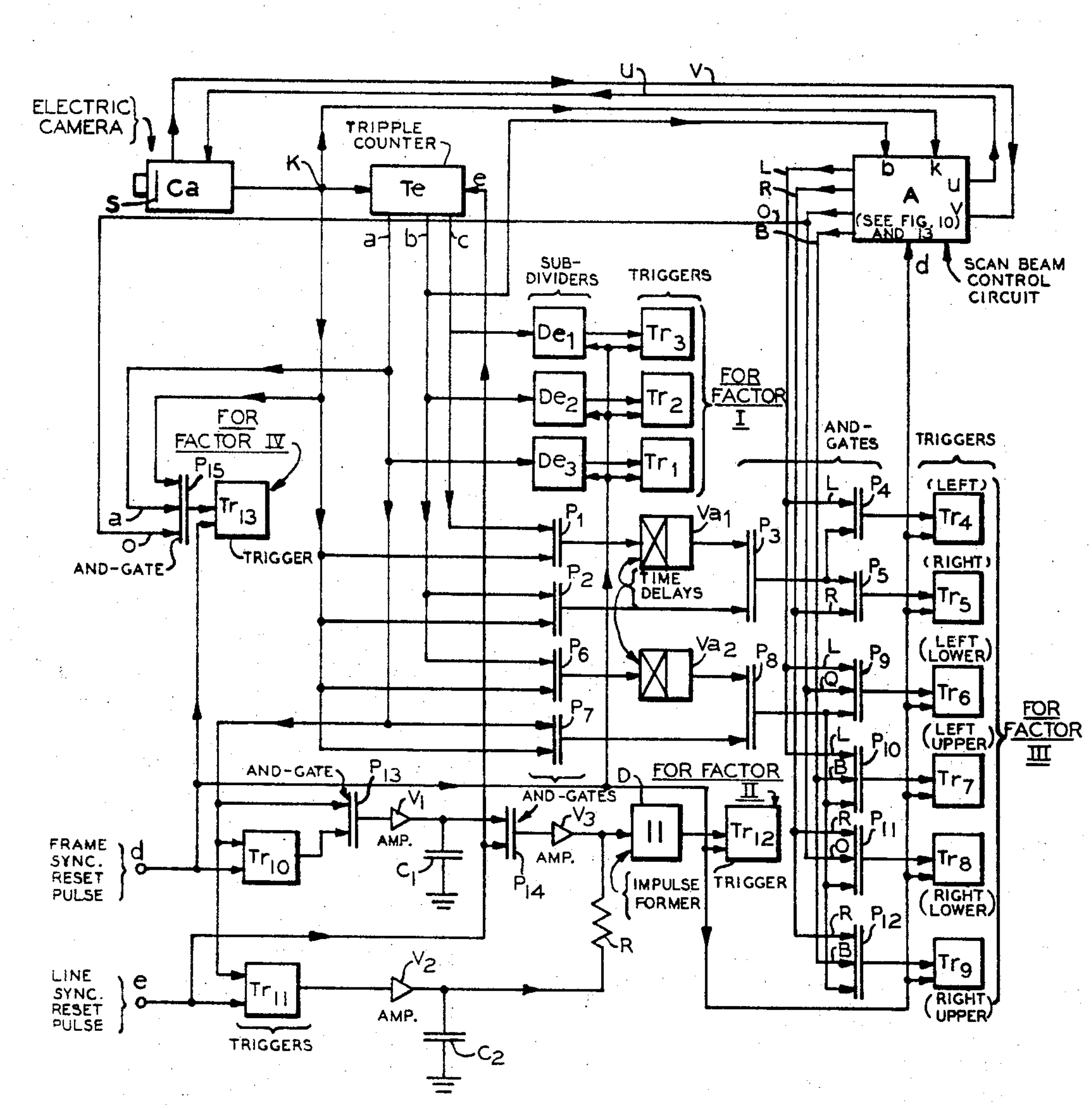
FIG. 8 is a schematic block wiring diagram of one embodiment of a circuit for determining all of the recognition factors for a numeral or digit according to the present invention as indicated in the previous figures.

FIG. 8 shows a block wiring diagram of a circuit for responding to the binary video code signals from the electronic camera *Ca* and, in block A at its upper right, the scanning control circuit for the scanning beam in the camera *Ca*. A schematic block wiring diagram of the scan beam control circuit A is shown in FIG. 9 in connection with the wave forms of FIG. 10, which beam scans each image on the screen as just described above.

FIGS. 10*a* shows the horizontal deflection current *i* as a function of time during one image scanning cycle and can be compared with the wave form shown in FIG. 7. Apart from the step at the moment $t_2$, such a course of the current *i* can be realized by means of a voltage across the deflection coil as shown in the wave form of FIG. 10*b*. This step in the current occurring at the moment $t_2$ can then be obtained by changing over a trigger, which reduces the current in the deflection coil to half its value. Thus at the moment $t_3$ the current *i* must again reassume exactly the same value as it had at the end of moment $t_2$, which is achieved by a capacitor used as a memory.

Figure 9:
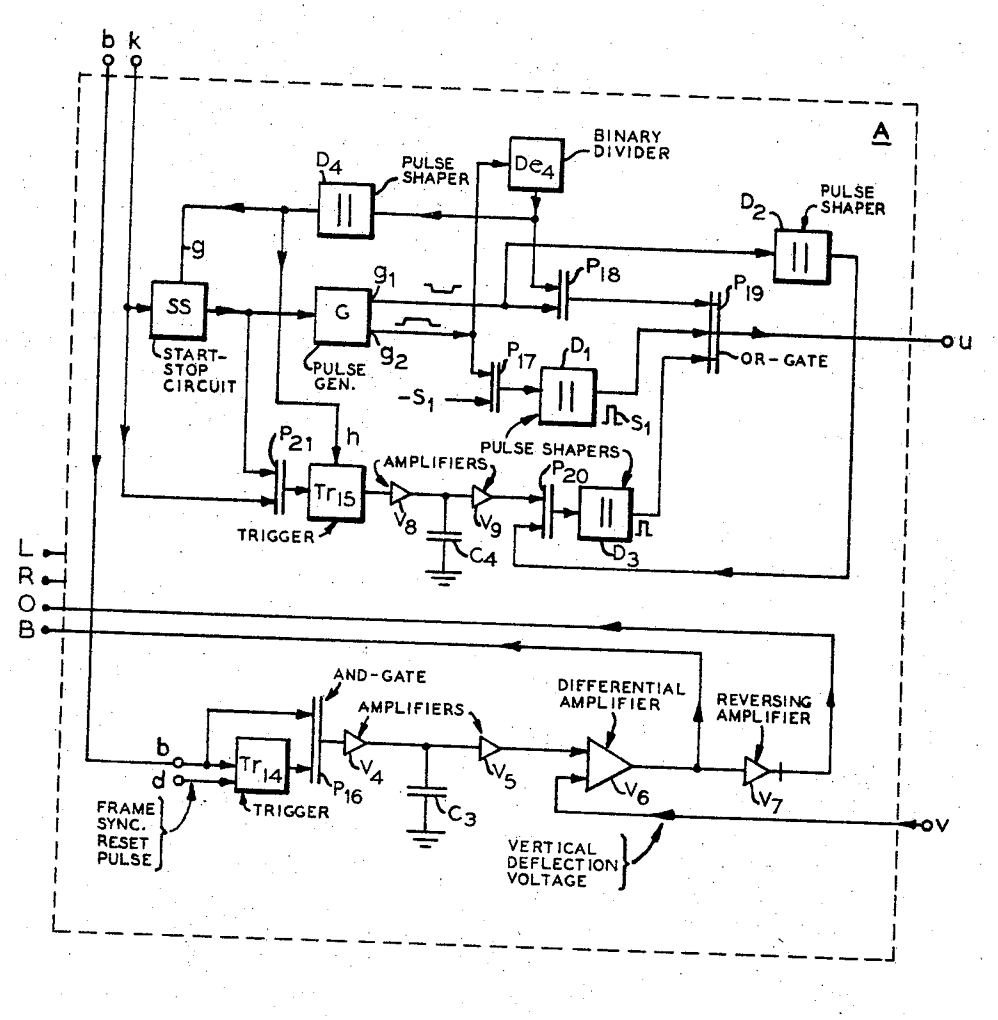
FIG. 9 is a schematic block wiring diagram of the circuit for controlling the scanning beam in the camera which is included in the block A shown in the upper right-hand corner of the diagram of FIG. 8.
Figure 10:
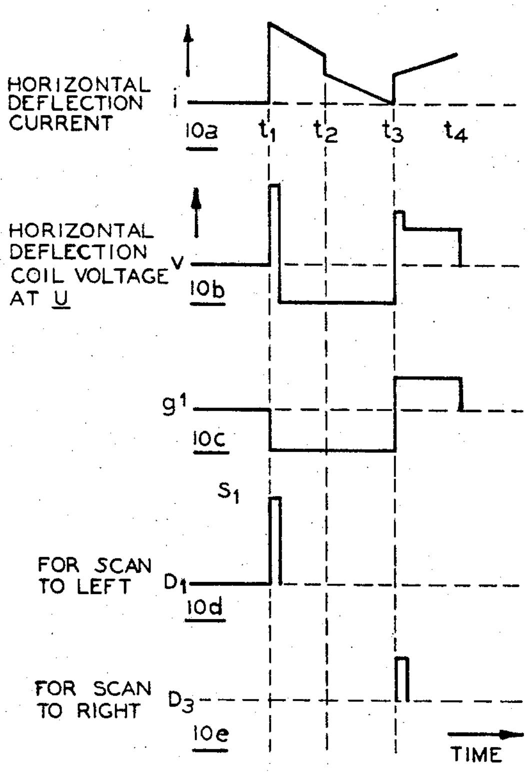
FIG. 10 is a series of wave forms of the currents and voltages produced for controlling the scanning beam according to the circuit shown in FIG. 9.

These wave patterns may be formed by a circuit such as shown in FIG. 9. This circuit contains a generator G preceded by a start and stop circuit SS, a trigger $Tr_{15}$, pulse shaping network $D_1$, $D_2$, $D_3$ and $D_4$, amplifiers $V_8$ and $V_9$, a capacitor $C_4$, a binary divider $De_4$ and AND-gates $P_{17}$ through $P_{21}$.

This circuit is supplied at K with a video signal from the television camera *Ca*. Between two image scannings the direct current flowing in the horizontal deflection coil in camera *Ca* is such that the electron beam scans the vertical scan line $x_1x_2$ (see FIG. 6). When there appears a pulse in the video signal, the circuit SS is changed over, due to which the generator G starts. FIG. 10*c* shows the output voltage at its terminal $g_1$ as a function of time. As at the moment $t_1$ there occurs a negative voltage step at the terminal $g_1$; and correspondingly a positive voltage step occurs at the terminal $g_2$. This latter positive voltage is applied to the AND-gate $P_{17}$ and the binary divider $De_4$. The other input terminal of this gate $P_{17}$ is supplied with a potential $-S_1$, which is higher than that of the output terminal $g_2$ before the voltage step. As a result of this, a positive pulse of the appropriate voltage $+S_1$, as shown in the wave form of FIG. 10*d*, will appear at the output terminal of the pulse shaping network $D_1$. This pulse $S_1$ is applied to the OR-gate $P_{19}$ and appears at the output terminal *u* of this circuit A.

The negative voltage signal delivered by the output terminal $g_1$ of the generator G is applied to the AND-gate $P_{18}$ and, in the present state of the binary divider $De_4$, is passed on to the OR-gate $P_{19}$, which passes it further to terminal *u*. Due to the positive pulse of the value $+S_1$ applied to the deflection coil of the vidicon, the electron beam is immediately horizontally jumped to the final vertical scan line $p_1p_2$ (see FIG. 6.) Now the horizontal deflection current *i* decreases linearly, under the normal negative voltage of the pulse from the terminal $g_1$ (see FIG. 10*b*) until another pulse occurs in the videa signal causing the opening of the AND-gate $P_{21}$ and the change-over of the trigger $Tr_{15}$. This is done at the moment $t_2$ when the scan beam detects the trailing edge of the image. Due to the change-over of the trigger $Tr_{15}$, a network having the same impedance as the deflecting coil is connected in parallel to the latter, so that the current through the coil is halved. This halved value of the deflecting current must be remembered for time $t_3$, and this is accomplished through the amplifier $V_8$ which has been delivering a constant charging current for the capacitor $C_4$ up to the moment $t_2$. Consequently the voltage across this capacitor is a measure for the current when the time $t_3$ occurs to return the beam to the center of the image.

The beam now vertically scans the left half of the image in horizontal increments until the leading edge of the image is reached at the moment $t_3$, when the electron scanning beam must be moved back to the scan center line of the image. At this moment $t_3$ there appears at the output terminal $g_1$ of the generator G a positive voltage step, which is converted into a positive pulse by the pulse shaping network $D_2$. Thus the AND-gate $P_{20}$ is opened and the pulse shaping network $D_3$ delivers a positive voltage pulse of a value corresponding to the voltage across the capacitor $C_4$ (see wave form in FIG. 10*e*). This pulse is passed on again by the OR-gate $P_{19}$ to the output terminal *u*. So at this output terminal *u* there will appear a voltage which, when plotted against the time, is shown in the wave form of FIG. 10*b*.

The binary divider $De_4$ is connected to the output terminal $g_2$ of the generator G. At the moment $t_4$ in FIG. 10*b*, the output terminal of the divider $De_4$ becomes positive. The pulse shaping network $D_4$ forms from this positive voltage step a positive voltage pulse, which controls the start-stop circuit SS so as to stop the generator G. Moreover this positive pulse delivered by the pulse shaping network $D_4$ at the moment $t_4$ is applied to the trigger $Tr_{15}$ to restore it to normal.

Thus, the correct potentials of the output terminals Land R are obtained from the deflection device or scan beam control circuit A at the times $t_2$ and $t_3$, respectively.

The scan beam control circuit A in FIG. 9 also may contain the circuit for the upper quadrants output terminal O and the lower quadrants output terminal B. This circuit consists of the capacitor $C_3$, the AND-gate $P_{16}$, the trigger $Tr_{14}$, and the amplifiers $V_4$, $V_5$, $V_6$ and $V_7$.

The terminal *b*, the second output terminal of the triple counter T*e* of FIG. 8, changes potential as soon as the pulse caused by the second intersection in the central scan line or column for a digit appears. This potential change at terminal *b* blocks the AND-gate $P_{16}$, thus blocking the amplifier $V_4$ as well, so that the constant charging current for the capacitor $C_3$ stops flowing. This potential change at terminal *b* also changes over the trigger $Tr_{14}$ due to which the amplifier $V_4$ remains blocked even after the potential change at the terminal *b* has disappeared. The voltage across the capacitor $C_3$ is again a measure for the height of the said second intersection. Amplifier $V_5$ is a direct current voltage amplifier having a very high input resistance. Amplifier V is a differential amplifier, and amplifier $V_7$ is a reversing amplifier. One input terminal of the amplifier $V_6$ is connected to the output terminal of the amplifier $V_5$, and its other input terminal is supplied with the saw-tooth vertical deflection voltage *v* from the saw-tooth vertical deflection circuit in the vidicon camera circuit C*a*. So the output voltage of the differential amplifier $V_6$ always indicates whether the instantaneous value of the vertical deflection voltage is large or smaller than the voltage across the capacitor $C_3$. The output terminal B is for example positive when the upper part of the image is being scanned, and the output terminal O is positive when the lower part of the image is being scanned.

The frame sychonization pulse *d*, which occurs at the end of the scanning of an image of a digit on the screen S, restores the trigger $Tr_{14}$ to normal at which time the capacitor $C_3$ is then discharged.

(2) *First recognition factor I.*—FIG. 8, a schematic block wiring diagram of the circuit for determining all recognition factors I, II, III, and IV, shows television camera or vidicon C*a*, the triple counter T*e*, AND-gates $P_1$ through $P_{15}$, the delay circuits $Va_1$ and $Va_2$, the triggers $Tr_1$ to $Tr_{13}$, the subdividers $De_1$, $De_2$ and $De_3$, the amplifiers $V_1$, $V_2$ and $V_3$, the impulse-forming network D and the capacitors $C_1$ and $C_2$.

The video signal from the television camera C*a*, is again supplied to counter T*e*, for determining the number of intersections in a vertical image line, providing the first recognition factor I. For one, two, or three intersections, triggers $Tr_1$, $Tr_2$, and $Tr_3$ are successively actuated, by the changes in the potentials at outputs *a*, *b*, and *c* of the counter T*e*. The actuation of a trigger $Tr_1$, $Tr_2$, or $Tr_3$, however is only effected on an intersection in two or more image lines having been found because of the presence of subdividers $De_1$, $De_2$, and $De_3$, whereby only the second impulse on the counter output *a*, *b*, or *c* becomes active at the trigger input. The triggers and subdividers are restored by the frame synchronisation impulse *d* following the scanning of the entire image, while the counter T*e* is restored by the line synchronisation impulse *e* after the scanning of each vertical line or column.

(3) *Second recognition factor II.*—The second recognition factor II employed for distinguishing between the digits in FIG. 2*d* and the digits in FIG. 2*a* or 2*c* is determined by the lower part of the circuit in FIG. 8. Here capacitor $C_1$ is charged by amplifier $V_1$ with a constant current and discharged at the end of a vertical scanning line, up to the moment in which in the central line, the first intersection will generate an impulse in the video signal. At this moment the output *a* of counter T*e* will suffer a change in potential and the amplifier $V_1$ is blocked by AND-gate $P_{13}$. Trigger $Tr_{10}$ is also actuated by the output *a*, so that amplifier $V_1$ remains blocked regardless of the potential at output *a* thereafter. Thus the height of the first pulse from the center scan line is retained throughout the scanning of each image, because the center line of each image is the first line actually scanned, that is, starting at time $t_2$ in FIGS. 7 and 10. Capacitor $C_1$ will now not be fully charged and its voltage will represent the height of the first intersection in the central scan line. Trigger $Tr_{10}$ is restored at the end of image scanning by the frame synchronization impulse at input *d*, at which moment capacitor $C_1$ also will be discharged.

Capacitor $C_2$ will be charged in a like manner by amplifier $V_2$, which amplifier will be blocked as soon as an impulse at the moment of the first intersection actuates trigger $Tr_{11}$. However both the capacitor $C_2$ and amplifier $V_2$ will be restored at the end of each vertical scanning by the line synchronisation impulse at its input *e*.

If the first intersections in the left-hand and the right-hand image half appear on the level of the intersections on the central line, the voltages on capacitors $C_1$ and $C_2$ at the end of each scanning line will be equal. On the occurrence, however, of a first intersection at a considerable higher level than for the central line, the voltage of the capacitor $C_2$ will be smaller than that on capacitor $C_1$. Then at the end of each scanning line AND-gate $P_{14}$ will be opened by the line synchronisation impulse *e*, whereby amplifier $V_3$ will conduct, so that the voltage difference between capacitors $C_1$ and $C_2$ will not be present across resistance R, and will actuate trigger $Tr_{12}$ by way of impulse shaping network D. Trigger $Tr_{12}$ will be restored later on by the frame synchronisation impulse *d*.

(4) *Third recognition factor III.*—The third recognition factor III, based on the meeting of intersected lines or occurrence of loops, will be determined by the circuits shown in the center part of FIG. 9.

The first impulse on scanning the first intersection in a vertical image line $x_1x_2$ modifies the potential at the output *a* of the triple counter T*e*. Thereby this first impulse may penetrate to the output of AND-gate $P_7$. On scanning the second intersection in this image line, the second impulse is generated, whereby the potential of the output *a* is restored and the output *b* is modified, whereby the second impulse may penetrate to the output of the AND-gate $P_6$. This second impulse is then led through the delay circuit $Va_2$ in order to delay it by the duration of the scanning of the vertical image line since two vertical adjacent scans are required to make a detection. The outputs of AND-gate $P_7$ and of the delay circuit $Va_2$ are connected to the inputs of AND-gate $P_8$, at the output of which an impulse will be generated by the coincidence, if any, of the first impulse in an image line with the delayed second impulse from the preceding scan line. Trigger $Tr_6$ may then be moved over in order to record a meeting of the intersected lines. At fifteen to twenty image lines for each digit, meeting points will be sharply detected but if the number should be much higher, difficulties may arise because of detection of vague contours.

Thus, the first two lines will utilize the AND-gates $P_6$, $P_7$ and $P_8$ and the delay circuit $Va_2$, and the second and third line will utilize AND-gates $P_1$, $P_2$ and $P_3$ and the delay circuit $Va_1$. For determining more exactly the point of meeting, the further AND-gates $P_4$, $P_5$, $P_9$ through $P_{12}$ are provided and these have at their input the outputs L, R, O, and B connected to deflection device on scan control circuit A, shown in the right-hand upper portion of FIG. 8 and in FIG. 9 previously described. These outputs L, R, O and B respectively show the electronic beam to be directed to the left-hand, L, the right-hand, R, the upper, O, or the lower, B, image parts. The meeting of the second and third intersected line may take place on the left-hand or on the right-hand image half.

In the first case an impulse will occur at the output of AND-gate $P_4$, actuating trigger $Tr_4$, whereas in the second case an impulse will occur at the output of AND-gate $P_5$, actuating trigger $Tr_5$. On the second and third intersected lines meeting it should be ascertained whether this takes place in the upper or in the lower image half. If it occurs at the left-hand lower section an impulse will occur on the output of AND-gate $P_9$ and trigger $Tr_6$ will be actuated. If it occurs in the left-hand upper, in the right-hand lower or in the right-hand upper section, trigger $Tr_7$ will be actuated by AND-gate $P_{10}$, and respectively trigger $Tr_8$ by gate $P_{11}$, or trigger $Tr_9$ by gate $P_{12}$.

On completion of the scanning of the image the triggers are restored by the frame synchronisation impulse *d*.

(5) *Fourth recognition factor IV*.—The fourth recognition factor IV can be found by means of AND-gate $P_{15}$ and trigger $Tr_{13}$ in FIG. 8, in order to distinguish between the shapes of digits of FIGS. 3*g* and 3*i*. At the inputs of AND-gate $P_{15}$ the output K of television camera *Ca*, is connected, as well as the output *a* of triple counter *Te*, and the output O of the deflection device or scan control circuit A. This latter output O will suffer a potential change whenever the electronic beam scans below the level at which the second impulse in the video signal will have appeared during the scanning of the central line as described in FIG. 9 and section B–1 above. If now on the scanning of one of the other verticals, the first pulse lasts beyond the potential change at the output O, the trigger $Tr_{13}$ is changed over via the AND-gate $P_{15}$ which is open now, giving an indication that the digit of FIG. 3*g* is being scanned. This trigger $Tr_{13}$ is restored to normal also by the frame synchronisation pulse *d*.

(6) *Summary*.—In the table below the trigger states required for recognizing the different digits shown in FIGS. 2 through 4 are indicated for each of the digit shapes. A prime indicates that the relevant trigger has not been changed over. In this connection, it is to be observed that both or one of the trigger states mentioned in parenthesis may occur. So the appropriate output terminals of the relevant triggers have to be connected to an OR-gate, the output terminal of which is connected to an AND-gate, together with the appropriate output terminals of the other triggers in the same row. Then the reading of the relevant digit is indicated by the opening of the latter gate.

| Digits | Triggers in Fig. 8 |
|---|---|
| 1 or 1 | $Tr_2'.Tr_3'.Tr_{12}'$ |
| 1 | $Tr_2.Tr_3'.Tr_6'.Tr_7'$ |
| 4 | $Tr_2'.Tr_3'.Tr_{12}$ |
| 4 or 4 | $Tr_3'.(Tr_6+Tr_7).(Tr_8'+Tr_{91}).Tr_{13}$ |
| 7 | $Tr_3'.(Tr_6'+Tr_7').(Tr_8+Tr_9)$ |
| 0 | $Tr_3'.Tr_7.Tr_9.Tr_{13}'$ |
| 2 | $Tr_3.Tr_9.Tr_7'.(Tr_6+Tr_4).(Tr_8'+Tr_5')$ |
| 3 or 3 | $Tr_3.Tr_9.(Tr_8+Tr_5).Tr_7'.(Tr_6'+Tr_4')$. |
| 5 | $Tr_3.Tr_9'(Tr_5+Tr_8).Tr_7.(Tr_4'+Tr_6')$. |
| 6 | $Tr_3.Tr_9'.Tr_7.(Tr_6+Tr_4).(Tr_8+Tr_5)$. |
| 8 | $Tr_3.Tr_9.Tr_7.(Tr_4+Tr_6).(Tr_5+Tr_8)$. |
| 9 | $Tr_3.Tr_9.Tr_7.(Tr_5+Tr_8).(Tr_4'+Tr_6')$. |

While there is described above the principles of this invention in connection with specific apparatus, it is to be clearly understood that this description is made only by way of example and not as a limitation to the scope of this invention.

What is claimed is:

1. An apparatus for reading irregularly written characters comprising:
   (a) an electron beam scanning means (*Ca*) having a photocathode screen,
   (b) means for projecting said characters on said screen (S),
   (c) means (*v*, *u*) for controlling the scanning means to parallelly scan said characters in transverse increments across said screen,
   (d) means ($Tr_{15}$) responsive to said scanning means for determining the leading and trailing edges of each character projected on said screen,
   (e) means (A) responsive to said edge determining means for determining the center scan line of each character,
   (f) means ($Tr_{10}$, $Tr_{11}$) responsive to said scanning means for determining the height of the first spot of said character scanned along each parallel scanning line,
   (g) means (*Te*, $Tr_1$, $Tr_2$, $Tr_3$) responsive to said scanning means for determining the number of spots of said characters scanned along each parallel scanning line,
   (h) means ($Tr_{12}$) for comparing the height of the spot scanned along said center scan line with those along each of the parallel scan lines on each side of said character, and
   (i) means ($Tr_4$ through $Tr_9$) for comparing the number of spots scanned along adjacent parallel scan lines to determine the merging of lines of said character.

2. An apparatus according to claim 1 wherein said means responsive to said scan means for determining the leading and trailing edges comprises an AND-gate, a trigger circuit, and a capacitor.

3. An apparatus according to claim 1 wherein said means for determining the height of the first spot of said character comprises a trigger circuit.

4. An apparatus according to claim 3 wherein said means for comparing the heights of the first spots scanned comprises a pair of trigger circuits, a pair of condensers, a resistor, and an impulse shaping circuit.

5. An apparatus according to claim 1 wherein said means for comparing the number of spots scanned comprises a counting circuit and trigger circuits.

6. An apparatus according to claim 5 wherein said counting circuit includes subdivider circuits for insuring a repeated reception of an intersection by adjacent scanning beams.

7. An apparatus according to claim 1 wherein both said comparing means first scans the left half of said character from said center line and then scans the right half of said character from said center line, including the first scanning of said center line for making the comparisons.

8. An apparatus according to claim 1 including means for determining the transverse line at the edge of the second spot scanned along the center scan line of a character to divide that character into quadrants.

9. An apparatus according to claim 8 wherein said means for determining the merging of lines of a character is responsive to said means for dividing the character into quadrants to locate the quadrant in which lines merged.

10. An apparatus according to claim 1 wherein said means for determining the height of the first spot includes means ($C_1$) for storing the height of said first spot detected on said center scan line of said character.

11. An apparatus for reading digits irregularly written comprising:
   (a) an electron beam scanning means (*Ca*) having a photo-cathode screen,
   (b) means for projecting said digits on said screen (S),
   (c) means (*v*, *u*) for controlling the scanning means to vertically scan said digits in horizontal increments across said screen, (d) means ($Tr_{15}$) responsive to said scanning means for determining the leading and trailing edge of each digit projected on said screen, (e) means (A) responsive to said edge determining means for determining the center scan line of each digit, (f) means ($Tr_{10}$, $Tr_{11}$) responsive to said scanning means for determining the height of the first spot of said digit scanned along each parallel scanning line, (g) means ($Te$, $Tr_1$, $Tr_2$, $Tr_3$) responsive to said scanning means for determining the number of spots of said digits scanned along each parallel scanning line, (h) means ($Tr_{12}$) for comparing the height of the spots scanned along said center scan line with those first along the left half of said center line and then with those along the right half of said center line of said digit, (i) means ($Tr_4$ through $Tr_9$) for comparing the number of spots scanned along adjacent parallel scan lines to determine the merging of lines of said digit, (j) means ($Tr_{14}$) for determining the height of the edge of the second spot scanned along the center scan line of a digit to divide that digit into quadrants, and (k) means ($Tr_{13}$) responsive to the last determining means for determining which first spots scanned by said parallel scan lines terminate at heights lower than the height of the edge of the second spot on the center scan line for that digit.

12. A digit reader comprising:

(a) means ($Ca$) for projecting each digit to produce an image on a screen (S), (b) means ($Tr_{15}$) for first scanning said image to determine the edges of said image, (c) means (A) controlled by said first scanning of said image for determining the center scan line of said image, (d) means ($Te$, $Tr_1$, $Tr_2$, $Tr_3$) for counting the number of intersections of said image across said center scan line, (e) means (A) for controlling the second scanning of one half of said image from said center line and then the other half of said image from said center line, (f) means ($Tr_{10}$, $Tr_{11}$, $Tr_{12}$) responsive to said second scanning of said image for comparing the height of the intersections detected by the other scan lines with respect to the height of the intersections detected on said center scan line, (g) means ($Tr_4$ through $Tr_9$) responsive to said second scanning of said image for determining the merging of two lines of said image in each half thereof, and (h) means ($Tr_3$, $Tr_{14}$) responsive to said second scanning and said counting means for determining the merging of two lines of said image above and below the second of said intersections with said center scan line.

References Cited

UNITED STATES PATENTS

| | | | |
|---|---|---|---|
| 3,065,457 | 11/1962 | Bailey et al. | 340—146.3 |
| 3,142,818 | 7/1964 | Holt | 340—146.3 |
| 3,189,873 | 6/1965 | Rabinow | 340—146.3 |
| 3,223,973 | 12/1965 | Chatten | 340—146.3 |

MAYNARD R. WILBUR, *Primary Examiner.*

J. I. SCHNEIDER, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,407,386 October 22, 1968

Arie Adriaan Spanjersberg

It is certified that error appears in the above identified patent and that said Letters Patent are hereby corrected as shown below:

Column 1, between lines 45 and 46 insert:

With this information any one of the ten Arabic digits, "1" through "9" and "0", can be distinguished from any other one written or printed in any normal way.

All of these determinations are made by standard electronic logic circuits, such as AND- and OR- gates, pulse triggers, pulse counters, delaying devices, pulse shapers, amplifiers, and the like.

Column 5, line 57, "the" should read -- to --. Column 7, line 33, "V" should read -- $V_6$ --. Column 8, line 41, "not" should read -- now --.

Signed and sealed this 17th day of March 1970.

(SEAL)
Attest:

Edward M. Fletcher, Jr.
Attesting Officer

WILLIAM E. SCHUYLER, JR.
Commissioner of Patents